US007983334B2

(12) United States Patent
Abou Rjeily (10) Patent No.: US 7,983,334 B2
(45) Date of Patent: Jul. 19, 2011

(54) NONCOHERENT UWB COOPERATIVE COMMUNICATIONS SYSTEM

(75) Inventor: Chadi Abou Rjeily, Zahle (LB)

(73) Assignee: Commissariat a l'Energie Atomique, Paris (FR)

( * ) Notice: Subject to any disclaimer, the term of this patent is extended or adjusted under 35 U.S.C. 154(b) by 1127 days.

(21) Appl. No.: 11/736,284

(22) Filed: Apr. 17, 2007

(65) Prior Publication Data

US 2008/0037623 A1 Feb. 14, 2008

(30) Foreign Application Priority Data

May 2, 2006 (FR) ...................................... 06 51553

(51) Int. Cl.
*H03K 9/04* (2006.01)
*H04B 3/36* (2006.01)
*H04B 1/00* (2006.01)

(52) U.S. Cl. .......................... 375/239; 375/211; 375/130

(58) Field of Classification Search .................... 375/38, 375/239, 259, 130, 138, 140, 141, 146, 147, 375/211, 214, 242, 238; 332/106, 112; 329/311, 329/313; 370/203, 204, 205, 213, 310, 315, 370/316, 464, 480, 492, 230, 212, 274, 276, 370/277, 278, 279, 293; 455/7, 11.1, 20, 455/21, 23, 18
See application file for complete search history.

(56) References Cited

U.S. PATENT DOCUMENTS 3,659,085 A * 4/1972 Potter et al. ................... 701/207
3,705,307 A * 12/1972 Reeves et al. ................. 398/175
6,404,775 B1 * 6/2002 Leslie et al. ................... 370/466
7,733,937 B2 * 6/2010 Arslan .......................... 375/130
2004/0157550 A1 8/2004 Nakagawa

OTHER PUBLICATIONS

Chihong Cho, et al., "A UWB Repeater with a Short Relaying-delay for Range Extension", Wireless Communications and Networking Conference, XP010708442, vol. 2, Mar. 21, 2004, pp. 1154-1158.
Deqiang Chen, et al., "Noncoherent Demodulation for Cooperative Diversity in Wireless Systems", Global Communications Conference, XP010757488, Nov. 29, 2004, pp. 31-35.

(Continued)

*Primary Examiner* — Kevin M Burd
*Assistant Examiner* — Vineeta S Panwalkar
(74) *Attorney, Agent, or Firm* — Oblon, Spivak, McClelland, Maier & Neustadt, L.L.P.

(57) ABSTRACT

A method between terminals in a cooperative UWB pulse telecommunications system including a source terminal, a relay terminal, and a recipient terminal, the method including: transmitting, at the source terminal, a data symbol for the recipient terminal as a source signal constituted by a sequence of identical frames, the sequence corresponding to a symbol time, and each frame containing a pulse that is position-modulated by a PPM modulation alphabet; receiving, at the relay terminal, the source signal; detecting, at the relay terminal, a modulation position of a pulse in at least one frame of the source signal, referred to as the first position; transmitting, at the relay terminal, a relayed signal containing, in at least one predetermined subsequent frame of the symbol time, a pulse of which a position, referred to as a second position, is obtained from the first position by a permutation of the PPM modulation alphabet.

16 Claims, 5 Drawing Sheets

OTHER PUBLICATIONS

Vahid Tarokh, et al., "A Differential Detection Scheme for Transmit Diversity", Journal on Selected Areas in Communications, vol. 18, No. 7, Jul. 2000, pp. 1169-1174.

Chadi Abou-Rjeily, et al., "Distributed Algebraic Space Time Codes for Ultra Wideband Communications", Draft, Oct. 25, 2005, pp. 1-17.

Sheng Yang, et al., "Optimal Space-Time Codes for the MIMO Amplify-and-Forward Cooperative Channel", Draft, Feb. 7, 2006, pp. 1-42.

Neiyer S. Correal, et al., "An UWB Relative Location System", 4 pages, Mar. 3, 2004.

* cited by examiner

Fig. 1

BACKGROUND ART

NONCOHERENT UWB COOPERATIVE COMMUNICATIONS SYSTEM

TECHNICAL FIELD

This invention relates to the fields of ultra wide band (or UWB) telecommunications and cooperative telecommunications systems.

PRIOR ART

UWB telecommunications systems have been the subject of considerable research in recent years. These systems have the special feature of working directly in baseband on so-called ultra wide band signals. By UWB signal, we generally mean a signal conforming to the spectral mask stipulated in the FCC regulations of 14 Feb. 2002, revised in March 2005, i.e., basically a signal in the spectral band 3.1 to 10.6 GHz having a bandwidth of at least 500 MHz to −10 dB.

UWB signals can be divided into two categories: multi-band OFDM (MB-OFDM) signals and UWB pulse signals. A UWB pulse signal is constituted by very short pulses, on the order of a few hundred picoseconds to a nanosecond. The description below will be limited to UWB pulse systems.

Figure 1:
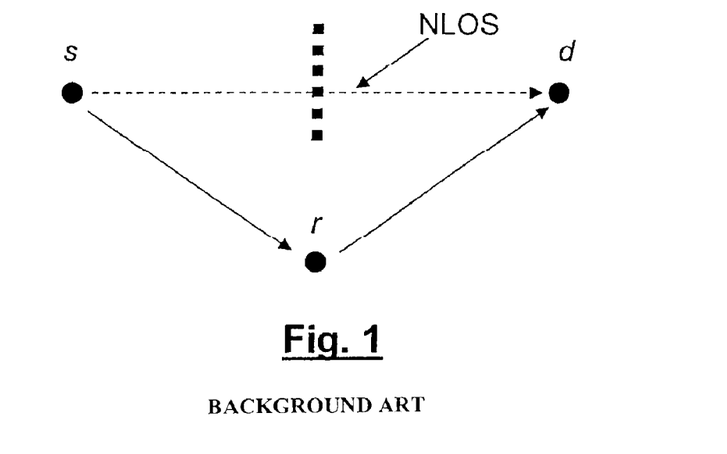
FIG. 1 diagrammatically shows a known cooperation strategy in a wireless network.

UWB systems are suitable for wireless personal networks (WPAN). In a conventional wireless network, such as a cellular telecommunications network, the connections are established between a transmitter and a receiver, without the participation of third-party terminals. To improve the spatial coverage of the wireless networks, ad-hoc architectures implementing strategies for cooperation between terminals have been proposed. FIG. 1 diagrammatically shows cooperation strategy in such a network. It is assumed that a source terminal s transmits a data flow to a recipient terminal d. The terminal r also receives the data flow sent by s and relays it to the recipient terminal d. The terminal r thus cooperates in the transmission of data between terminals s and d. For example, if the s-d channel is of poor quality, in particular due to the presence of an obstacle between s and d (NLOS configuration), the s-r-d channel enables it to be bypassed and allows a connection of satisfactory quality to be obtained. The data flow can be relayed by a plurality of terminals in order to further increase the spatial diversity of the transmission paths. In addition, it can be relayed in a one hop (single-hop) or in a plurality of successive hops (multiple-hop).

Families sharing access in wireless networks are known: TDMA (Time Division Multiple Access), CDMA (Code Division Multiple Access), SDMA (Space Division Multiple Access). In a TDMA network, each terminal has a transmission interval dedicated to it. Two possible modes of cooperation in a cooperative TDMA network are distinguished: parallel cooperation and serial cooperation.

In a parallel cooperation mode, the relay terminal receives the data from the source terminal during the transmission interval allocated to the latter and retransmits it to the recipient terminal during its specific transmission interval. The recipient terminal thus receives the same data, via different paths, first during the transmission interval of the source terminal and second during the transmission interval of the relay terminal. Although the term "parallel" may appear to be poorly chosen due to the sequential reception of data by the recipient terminal, it in fact refers to the absence of interference between the two paths, resulting from the time separation of the transmission intervals of the source and relay terminals. The operation in parallel cooperation mode assumes that the relay terminal does not have specific data to be transmitted during its transmission interval. This limitation substantially reduces the possibilities of cooperation.

In a serial cooperation mode, the relay terminal receives data from the source terminal during the transmission interval of the latter and retransmits it in the same interval. The relay terminal transmits only its specific data during its transmission interval. The recipient terminal thus receives the data from the source terminal, via two different paths during a transmission interval of the source terminal.

Due to the simultaneous transmission of specific data and relayed data during the same transmission interval, this data must be examined in order to ensure its orthogonality at the reception. This code is referred to as a distributed space-time code or DSTC.

Cooperative telecommunications systems are, like so-called MIMO (Multiple-Input Multiple-Output) systems, systems with transmission spatial diversity. Cooperative telecommunications systems are also on elegant way of emulating a MIMO system from single-antenna terminals. The type of detection used in a MIMO system or a cooperative system receiver depends on the data available on the channel. The following can be distinguished:

so-called coherent systems, in which the receiver knows the characteristics of the transmission channel, typically owing to a channel estimation performed using pilot symbols transmitted by the transmitter. The channel estimation is then used to detect data symbols. Coherent systems are generally intended for high rate applications;

non-coherent systems, in which the receiver performs a blind detection of the data symbols, without prior knowledge of the transmission channel characteristics;

differential systems, in which the data symbols are coded in the form of phase or amplitude differences between two consecutive transmission symbols. These systems may not require knowledge of the channel on the receiver side.

An example of a coherent cooperative system is known from the article of S. Yang and J.-C. Belfiore, entitled "Optimal space-time codes for the MIMO amplify-and-forward cooperative channel" available at the website www-.comelec.enst.fr. An example of a differential cooperative system was proposed in the article of V. Tarokh et al., published in IEEE Journal on selected areas in communications, Vol. 18, No. 7, July 2000.

While the systems in the aforementioned articles work well for narrowband signals, this does not apply to UWB signals. Indeed, these systems use codes with complex coefficients. However, in consideration of the very short duration of the pulses used, it is not possible to recover phase data in a UWB signal.

A coherent cooperative system using UWB signals and a code with real elements was proposed in the article of C. Abou-Rjeily et al., entitled "Distributed algebraic space time codes for ultra-wideband communications" submitted for publication in Kluwer Journal (Springer special issue on Cooperation in Wireless Networks). However, as mentioned above, such a system requires the receiver to have knowledge of the transmission channel.

The objective of this invention is to propose a robust non-coherent cooperative UWB system with a particularly simple architecture.

DESCRIPTION OF THE INVENTION

This invention is defined by a cooperation procedure between terminals in a UWB pulse telecommunications system in which a source terminal transmits a data symbol for a recipient terminal in the form of a signal, called a source signal, constituted by a sequence of identical frames, said sequence corresponding to a symbol time, with each frame containing a pulse that is position-modulated by means of a PPM modulation alphabet. A relay terminal, receiving said source signal, detects a modulation position of a pulse in at least one frame of the signal received, called the first position, and transmits a relayed signal containing, in at least one predetermined subsequent frame of said symbol time, a pulse of which the position, called the second position, is obtained on the basis of the first position by a permutation of the PPM modulation alphabet.

The invention also relates to a transmission/reception module of a UWB pulse telecommunications terminal intended to serve as a relay terminal, including:
- means for time slicing of the signal received according to a plurality of consecutive time windows corresponding to the frames of a UWB signal transmitted by a source terminal, thus obtaining a plurality of frame signals;
- means for measuring, for at least one frame, the energy of the frame signal in a plurality of modulation positions of a predetermined PPM alphabet;
- means for detecting the position corresponding to the highest of the energies thus measured in said frame;
- means for permutation of the positions of said PPM alphabet in order to obtain a permuted position from the position thus detected;
- means for generating a pulse in said permuted position during a frame of the signal received following said frame.

The invention finally relates to a reception module of a UWB pulse telecommunications terminal in which the data symbol is transmitted in the form of a signal, called a source signal, constituted by a sequence of identical frames, with each frame containing a pulse that is position-modulated by means of a PPM modulation alphabet, which reception module includes:
- means for time slicing of the time signal according to a plurality of time windows each corresponding to two consecutive frames of the source signal, called first and second frames;
- means for measuring the energy of the signal received, in each first frame, at each PPM alphabet modulation position, thus obtaining a first energy value for each modulation position;
- means for measuring the energy of the signal received, in each second frame, at each PPM alphabet modulation position and at positions obtained from the latter by means of a predetermined permutation, thus obtaining second and third energy values for each modulation position;
- means for summing, for each modulation position, the first, second and third energy values, thus obtaining a fourth energy value for each modulation position;
- means for summing, for each modulation position, the fourth energy values obtained for the different time windows, thus obtaining a fifth energy value for each modulation position;
- means for determining the modulation position corresponding to the highest of said fifth energy values;
- means for determining, on the basis of the position thus obtained, said data symbol.

BRIEF DESCRIPTION OF THE DRAWINGS

Other features and advantages of the invention will appear on reading about a preferred embodiment of the invention, in reference to the appended figures, in which.

DETAILED DESCRIPTION OF SPECIFIC EMBODIMENTS

The basic idea of the invention is to use a cooperation strategy using UWB signals with pulse position modulation or PPM while ensuring the orthogonality between the signal to be relayed and the signal relayed.

Figure 2A:
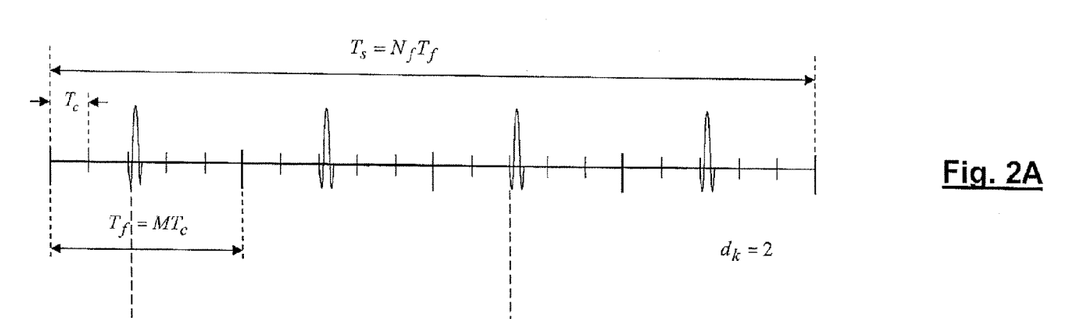
FIG. 2A shows a UWB pulse signal transmitted by a source terminal.

FIG. 2A shows such a UWB signal with PPM modulation. A data symbol to be transmitted is coded on a symbol time $T_s = N_f T_f$ where $T_f$ is a frame duration. Each frame is itself divided into a plurality M of basic intervals of duration $T_c$ also called pulse repetition intervals or PRI.

The UWB pulse transmitted by the source terminal k can be expressed by:

$$s_k(t) = A_s^k \sum_{n=0}^{N_f - 1} p(t - nT_f - d_k T_c) \quad (1)$$

where p(t) is the waveform of the basic pulse, $A_s^k$ is a coefficient dependent on the transmission power and $d_k \in \{0, \ldots, M-1\}$ is the M-ary PPM position of the symbol to be transmitted. M represents the cardinality of the PPM modulation alphabet. It is noted that the modulation position $d_k$ is identical in the $N_f$ different frames constituting the signal. Indeed, it is not necessary to provide distinct time-hopping sequences for the different users as in TH-UWB (Time Hopping UWB), as the access separation is produced by distinct transmission intervals. Each transmission time interval or TTI is divided into a plurality of symbol periods $T_s$.

The duration $T_c$ of the basic interval is advantageously chosen so as to be greater than the spread of the channel, generally on the order of 100 ns. A separation of pulses upon reception is thus obtained without requiring a preliminary equalisation.

The relay terminal r receives the signal transmitted by the source terminal s during the transmission time interval (TTI) allocated thereto. The signal received by the relay terminal can be expressed by:

$$\rho_k(t) = A_s^k \sum_{n=0}^{N_f - 1} p(t - nT_f - d_k T_c) \otimes h_{sr}(t) + w(t) \quad (2)$$

where $h_{sr}$ is the impulse response of the channel between s and r, assumed to have a time support lower than $T_c$, and w is a random noise function.

The relay terminal performs a non-coherent detection in the even frames n (the first frame of the symbol being indexed by 0). To do this, the relay terminal calculates on-the-fly the energy of the signal received for the various modulation positions in the current even frame, namely:

$$\varepsilon_k^n(m) = \int_{nT_f+mT_c}^{nT_f+(m+1)T_c} |\rho_k(t)|^2 dt \qquad (3)$$

and determines, for each even frame n, the position corresponding to the symbol transmitted by means of:

$$\hat{d}_k^n = \underset{m}{\mathrm{Argmax}}(\varepsilon_k^n(m)) \qquad (4)$$

It is noted that if the detection is correct, we of course have:

$$\hat{d}_k^n = d_k, \text{ even } \forall n, 0 \leq n \leq N_f-1 \qquad (5)$$

Based on the value of the position detected in frame n, the relay terminal transmits, to the next frame n+1, a relayed signal. The relayed signal can be expressed by:

$$s_k^r(t) = A_k^r \sum_{\substack{n=0 \\ n \text{ even}}}^{N_f-1} p(t-(n+1)T_f - \sigma(\hat{d}_k^n)T_c) \qquad (6)$$

where $A_k^r$ is a coefficient dependent on the transmission power of the relay terminal and where σ is a permutation of the alphabet {0, ..., M−1}, for example a circular permutation. A permutation is any bijection of {0, ..., M−1} on itself, except the identity. A circular permutation σ is defined by the relation σ(m)=m+q (mod M) where q is an integer such that 0<q≦M−1.

Figure 2B:
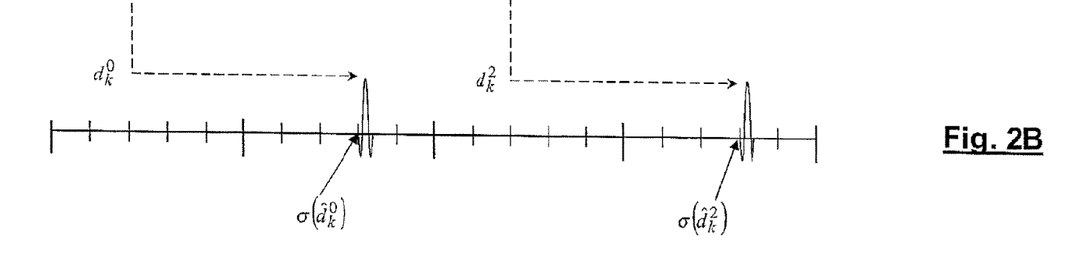
FIG. 2B shows a UWB pulse signal transmitted by a relay terminal.
Figure 2C:
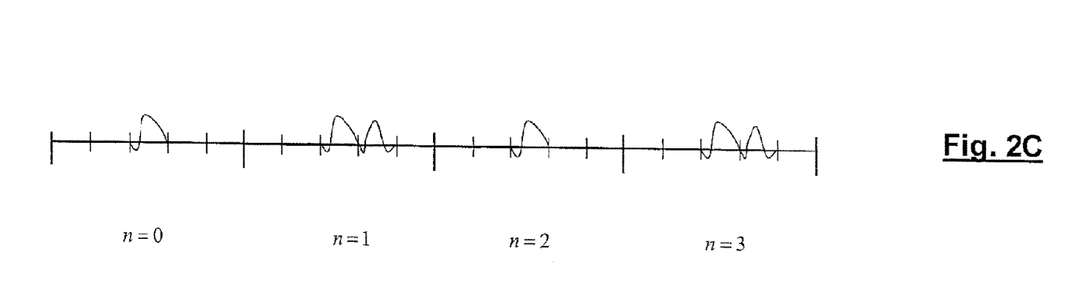
FIG. 2C shows a UWB pulse signal received by a recipient terminal in a cooperative network using the cooperation procedure according to the invention.
Figure 3:
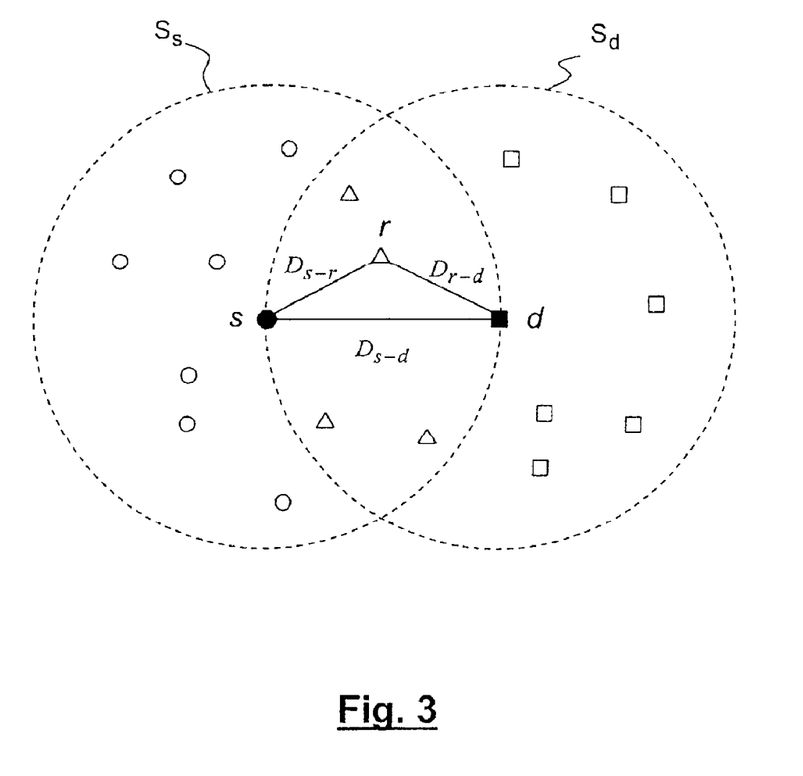
FIG. 3 shows the choice of a relay terminal by joint action between a source terminal and a recipient terminal.

The signal relayed in FIG. 2B is shown, with the assumption that the detection by the relay terminal was correct in the sense of (5). It is noted that the relayed signal is present only in the odd frames (n=1; n=3) and that the PPM position inside these frames has been subjected to a permutation with respect to those of the source signal, here a cyclical rotation by one position to the right, i.e. σ(m)=m+1(mod M).

The signal received by the recipient terminal d can be expressed by:

$$R_k(t) = A_k^s \sum_{n=0}^{N_f-1} p(t-nT_f-d_kT_c) \otimes h_{sd}(t) + \\ A_k^r \sum_{\substack{n=0 \\ n \text{ even}}}^{N_f-1} p(t-(n+1)T_f - \sigma(\hat{d}_k^n)T_c) \otimes h_{rd}(t) + v(t) \qquad (7)$$

where $h_{rd}(t)$ is the impulse response of the channel between r and d, with a time support lower than $T_c$ and where v(t) is a random function representing the noise. It should be noted in (7) that the principle of cooperation between the terminals is particularly robust since the orthogonality between the direct and relayed signals is ensured by a simple predetermined time permutation on the PPM positions. Indeed, if the detection by the relay is correct: $\sigma(\hat{d}_k^n) = \sigma(d_k) \neq d_k$, and it is noted that there is no overlapping of pulses because $T_c$ is greater than the spread of the channel (s-r or s-r-d).

The recipient terminal performs a non-coherent detection on the signal received. To do this, it calculates the total energy, for each PPM position, namely:

$$E_k(m) = \qquad (8)$$
$$\sum_{n=0}^{N_f-1}\left(\int_{nT_f+mT_c}^{nT_f+(m+1)T_c}|R_k(t)|^2 dt\right) + \sum_{\substack{n=0 \\ n \text{ even}}}^{N_f-1}\left(\int_{nT_f+\sigma(m)T_c}^{nT_f+(\sigma(m)+1)T_c}|R_k(t)|^2 dt\right)$$

The first term of (8) corresponds to the signal received directly from the source terminal, while the second term corresponds to the signal received via the relay terminal. The M-ary symbol detected is then obtained from the decision:

$$\hat{d}_k = \underset{m}{\mathrm{Argmax}}(E_k(m)) \qquad (9)$$

It is noted that neither the recipient terminal nor the relay terminal needs to carry out a channel estimation.

The choice of coefficients $A_k^s$, $A_k^r$ and therefore of transmission powers of the source and relay terminals is dependent on the operating conditions.

We will first consider the case in which the respective conditions of the s-d and r-d transmission channels are not known. The coefficients in question can be chosen according to two distinct modes:

according to a first mode, the powers transmitted by the source terminal and the relay terminal are chosen so that their sum complies with the aforementioned FCC spectral mask. In other words, if P is the value of the power enabling compliance with the spectral mask, the powers of the source terminal and the relay terminal will be chosen to be equal to 2P/3 and P/3, respectively. Given that the relay terminal sends half the number of pulses as the source terminal, it in fact amounts to choosing $$|A_k^s|^2 = |A_k^r|^2 = \frac{1}{2}A^2$$

where A is the value of the amplitude that would have enabled the spectral mask to be satisfied with the source terminal alone. It is thus understood that the first mode can enable, for the same BER, the power of the source terminal to be saved by distributing it between the source and relay;

according to a second mode, the respective powers of the source and relay terminals also individually satisfy the spectral mask. In this case, the total power transmitted is twice the one that would have been transmitted by the source terminal alone. We then have $$|A_k^s|^2 = \frac{1}{2}|A_k^r|^2 = A^2.$$

The second mode makes it possible to obtain a 3-dB increase in power at the reception. In other words, with respect to the first mode above, or an operation without a relay, it is possible to obtain the same BER for a signal-to-noise ratio half that of the first mode of operation or an operation without a relay.

If the conditions of the s-d and r-d channels are known, for example the attenuation coefficients on these channels, the distribution of power between the source and relay terminals according to the first mode is no longer done by taking into account only the number of pulses transmitted in $s_k$ and $s_k^r$, but it also involves taking into account the attenuation conditions. The transmission powers of s and r are then chosen so that:

$$P_s = aP \text{ and } P_r = bP \text{ with } a+b=1 \qquad (10)$$

where the weighting coefficients a and b are determined, for example, on the basis of the attenuation coefficients of the s-d and r-d channels.

The coefficients a and b can alternatively be determined on the basis of transmission power control loops. To do this, power control indications, $TPC_s$ and $TPC_d$ (Transmission Power Control) are sent by the terminal d, via two return paths, to the terminals s and r. This assumes that a separate detection of the direct signal and of the relayed signal is periodically performed. According to the indications $TPI_s$ and $TPI_d$, the terminal s decrements/increments a and the terminal r increments/decrements b so that the sum of the weighting coefficients a+b remains equal to 1.

According to an alternative corresponding to an operation according to the second mode, it is possible to have independent return paths, wherein the coefficients a and b are no longer linked, but each remains lower than 1 so as to comply with the spectral mask.

In the cooperation strategy described above, it is assumed that there is a given relay terminal r. However, as a general rule, a plurality of terminals can perform the relay function. It is then necessary to make a selection.

Advantageously, according to a first alternative embodiment, the choice of the relay terminal is made by the cooperation between the source terminal s and the recipient terminal d on the basis of a proximity criterion. It is first assumed that the terminals can determine the distances separating them (peer-to-peer ranging) according to conventional pseudo-distance or round-trip propagation time calculation means. The UWB signals are suitable, due to their waveforms (short time pulses), for a location application. For example, there is a description of a method for calculating distances between UWB terminals in the article of Neiyer S. Correal et al., entitled "An UWB relative location system" available at the website www.ee.vt.edu.

The terminals s and d first determine the distance $D_{s-d}$ that separates them. The terminal s then determines the set $S_s$ of its close neighbours: to do this, it measures the distances that separate it from the surrounding terminals and selects those located less than $D_{s-d}$ from it. The terminal d similarly determines the set $S_d$ of its close neighbours. The relay terminal is selected in the set $S_s \cap S_d$ as the terminal minimising the sum $D_{s-r}+D_{r-d}$ where $D_{s-r}$ and $D_{r-d}$ are the distances between s and r and between r and d. If the set $S_s \cap S_d$ is empty, the cooperation procedure is temporarily abandoned.

According to a second alternative embodiment, the relay terminal is selected in the set $S_s \cap S_d$, on the basis of an error rate (BER). To do this, the source terminal transmits a sequence of predetermined symbols, called a preset sequence, for example a control channel sequence or a pilot symbol sequence, to the surrounding terminals. This sequence is known to all of the terminals, and each terminal that receives it can thus determine its BER by a comparison between the detected sequence and the preset sequence. Those belonging to $S_s \cap S_d$ and of which the BER is lower than a threshold value then send a message of acknowledgement to the source terminal, optionally specifying the range of error rate measured and/or the current load of the terminal. The source terminal selects the relay terminal from them.

Figure 4:
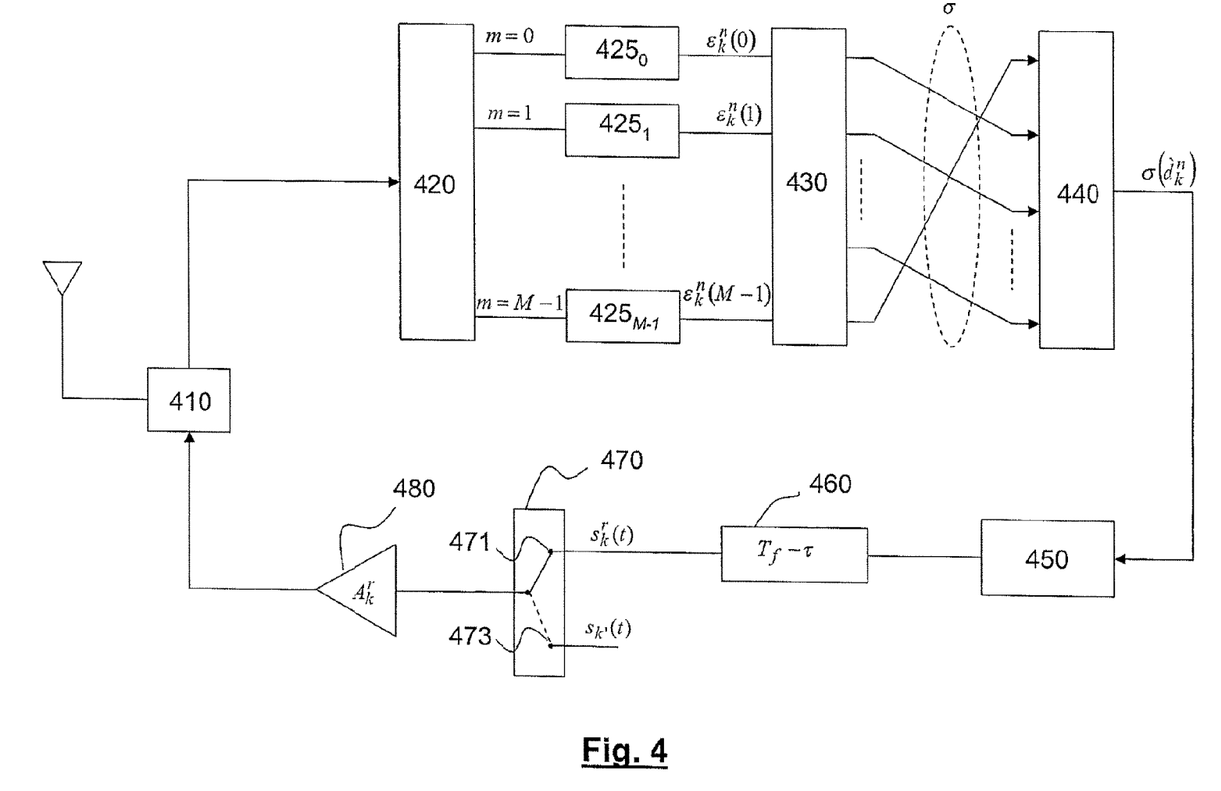
FIG. 4 diagrammatically shows a transmission/reception module of a relay terminal according to an embodiment of the invention.

FIG. 4 diagrammatically shows an embodiment of the transmission/reception module of a relay terminal according to the invention.

The signal of the source terminal is received via the duplexer 410. The duplexer 410 is in the reception position for the even frames and in the transmission position for odd frames. The signal received undergoes a time slicing for each PPM alphabet modulation position in the module 420. The time slicing of 420 is triggered at the beginning of each even frame and lasts for a time $T_c$ for each of the M modulation positions. The quadratic integrators $425_0, \ldots, 425_{M-1}$ respectively receive the signals thus obtained and measure the energy values $\epsilon_k''(m)$, $m=0, \ldots, M-1$. These values are provided in analogue form to the decision module 430. Said module performs a comparison and detects the most energetic position. It provides, at the output, a word of M bits coding the value $\hat{d}_k''$, for example by means of a bit equal to 1 for the modulation position detected and to 0 for the other bits.

This word then undergoes a circular permutation $\sigma$ of its bits, in this case performed by wiring, before being transformed into a sequence of M bits by the parallel-serial converter 440. The bit sequence is then modulated by a pulse modulator 450. More specifically, this modulator transforms a sequence $c_0, \ldots, c_{M-1}$ of M bits into an analogue signal $$\sum_{m=0}^{M-1} c_m \cdot p(t - mT_c).$$

This signal then undergoes a delay of $T_f - \tau$ in the delay line 460 where $\tau$ is the processing duration in the stages 410 to 450 before being transmitted, via the amplifier 480 and the duplexer 410. Reference 470 represents a switch upstream of the amplifier 480, receiving at its inputs the relayed signal $s_k^r(t)$ and the own signal $s_k(t)$ of the relay terminal. The switch is in position 471 during an interval TTI allocated to the source terminal and in position 473 during an interval TTI allocated to the relay terminal.

Figure 5:
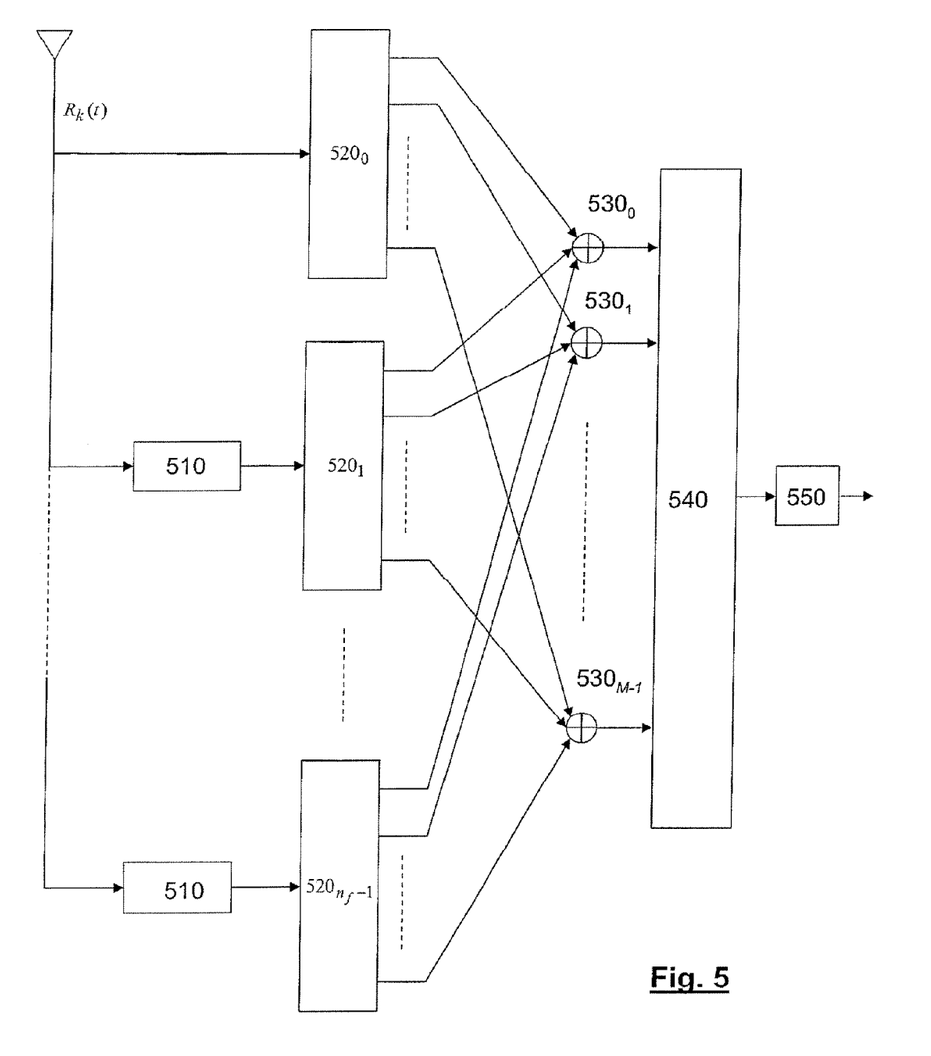
FIG. 5 diagrammatically shows a reception module of a recipient terminal according to an embodiment of the invention.

FIG. 5 diagrammatically shows an embodiment of the reception module of the recipient terminal according to the invention.

It is assumed in this figure that there is an even number $2n_f$ of frames, i.e. $N_f = 2n_f - 1$. The signal received $R_k(t)$ is delayed by the $(n_f - 1)$ delay lines 510, each with a delay value $2T_f$.

The signal $R_k(t)$ and the delayed signals are processed by $n_f$ modules $520_0, \ldots, 520_{n_f-1}$, with each of these modules performing a processing operation on two consecutive frames of the signal received.

Figure 6:
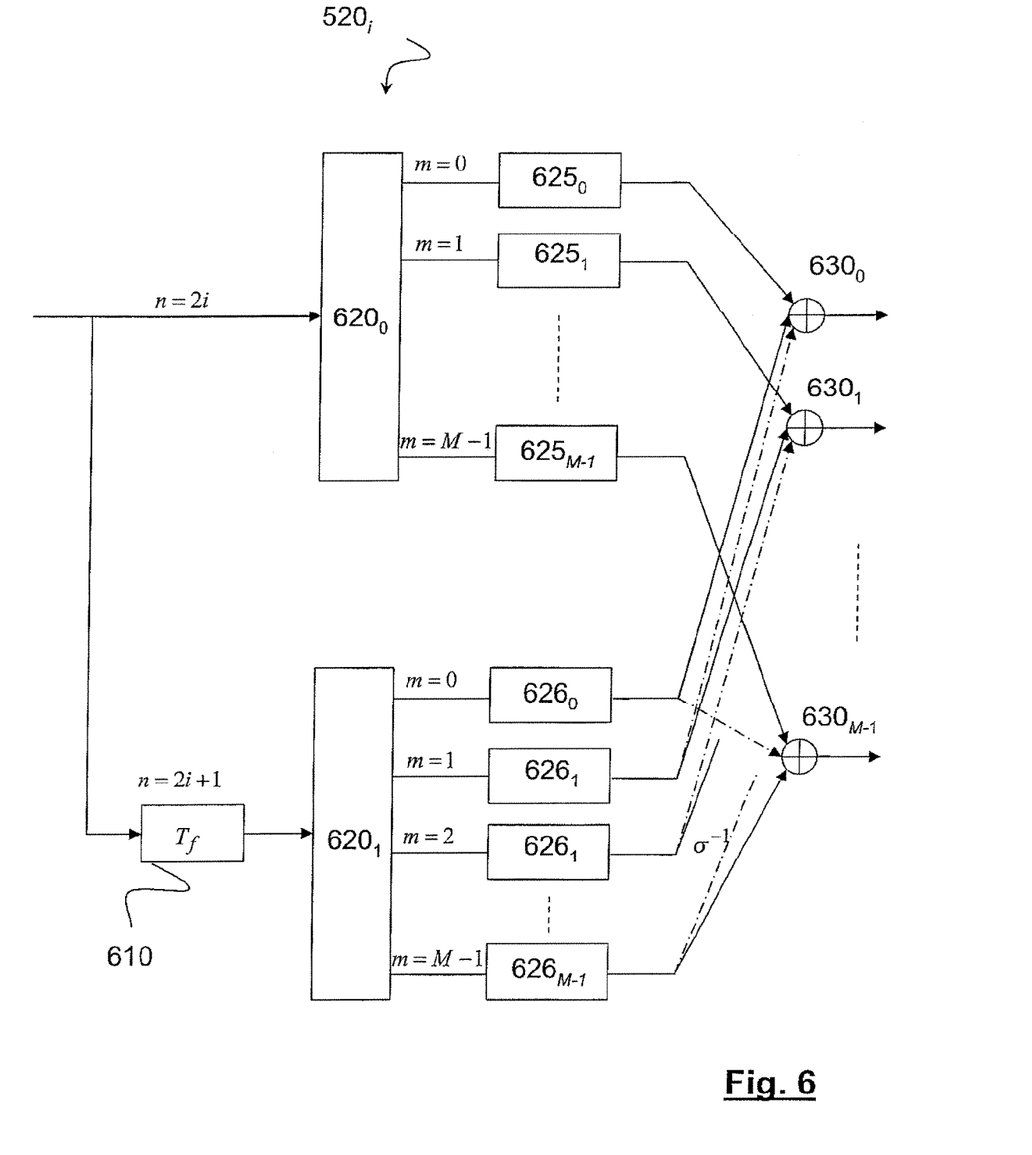
FIG. 6 shows the detail of a unit of the reception module of FIG. 5.

FIG. 6 diagrammatically shows the structure of a module $520_i$. The signal at the input is provided to a first time slicing module $620_0$ and, to a second time slicing module $620_1$ through a delay line 610 of value $T_f$. The modules $620_0$ and $620_1$ have identical structures and perform a slicing for each modulation position, like the modules 420 described above, with module $620_0$ taking charge of the even frame 2i and module $620_1$ taking charge of the odd frame 2i+1. The energies of the signals thus sliced are obtained by means of 2M quadratic integrators referenced $625_0, \ldots, 625_{M-1}$ for the even frame and $626_0, \ldots, 626_{M-1}$ for the odd frame. These energies are summed by means of summers $630_0, \ldots, 630_{M-1}$, with each summer $630_m$ being connected at the input to integrator $625_m$ and to the two integrators $626_m$ and $626_{\sigma(m)}$. The summer $625_m$ thus provides, at the output, the value:

$$\left(\int_{nT_f+mT_c}^{nT_f+(m+1)T_c} |R_k(t)|^2 dt\right) + \left(\int_{(n+1)T_f+mT_c}^{(n+1)T_f+(m+1)T_c} |R_k(t)|^2 dt\right) + \left(\int_{(n+1)T_f+\sigma(m)T_c}^{(n+1)T_f+(\sigma(m)+1)T_c} |R_k(t)|^2 dt\right) \quad (11)$$

where n=2i is the (even) rank of the frame taken charge of by module $620_0$.

Now turning back to FIG. 5, the $n_f$ outputs of the modules 520 corresponding to the same modulation position m are summed by means of a summer 530m. The outputs of these M summers represent the decision variables $E_k(m)$ of the equation (8). The module 540 performs a comparison of the values $E_k(m)$, m=0, . . . , M−1 and determines the most energetic position $\hat{d}_k$, in accordance with (9). In 550, it deduces the data symbol corresponding to said modulation position.

In the above description of the invention, it was assumed that the relay terminal had a "relaying rate of ½", with the even frames of the signal received being relayed during the odd frames of this signal. In general, it is understood that the relay terminal can have a "relaying rate" of 1/n with n≧2, each nth of the signal received being relayed during a subsequent frame of said signal.

The invention claimed is:

1. A method between terminals in a cooperative UWB pulse telecommunications system including a source terminal, a relay terminal, and a recipient terminal, said method comprising:
    transmitting, at the source terminal, a data symbol to the recipient terminal as a source signal constituted by a sequence of identical frames, said sequence corresponding to a symbol time, and each frame containing a pulse that is position-modulated by a PPM modulation alphabet;
    receiving, at the relay terminal, said source signal;
    detecting, at the relay terminal, a modulation position of a pulse in at least one frame of the source signal, referred to as the first position; and
    transmitting, at the relay terminal, a relayed signal containing, in at least one predetermined subsequent frame of said symbol time, a pulse of which a position, referred to as a second position, is obtained from the first position by a permutation of the PPM modulation alphabet.

2. The method according to claim 1, wherein the second position is obtained by comparing energies received in different positions of the PPM modulation alphabet in a received signal frame.

3. The method according to claim 1, wherein said subsequent frame of the relayed signal is consecutive to a received signal frame.

4. The method according to on of the previous claims, wherein said permutation is a cyclic shift.

5. The method according to claim 1, further comprising:
    selecting transmission powers of the source terminal and the relay terminal to be equal to a·P and b·P where P is a power value complying with a UWB spectral mask and where a and b are coefficients such that 0<a<1 and 0<b<1 with a+b=1.

6. The method according to claim 5, further comprising:
    determining the coefficients a and b according to respective conditions of a channel between the source terminal and the recipient terminal and a channel between the relay terminal and the recipient terminal.

7. The method according to claim 5, further comprising:
    controlling the coefficients a and b by power control loops by two return paths from the recipient terminal to the source terminal and the relay terminal, respectively.

8. The method according to claim 1, further comprising:
    selecting transmission powers of the source terminal and the relay terminal to be equal to a power value complying with a UWB spectral mask.

9. The method according to claim 1, further comprising:
    determining a distance separating the source terminal and the relay terminal;
    determining a first set of terminals located at a shorter distance than said distance from the source terminal;
    determining a second set of terminals located at a shorter distance than said distance from the source terminal;
    selecting the relay terminal among the terminals common to said first and second sets, referred to as candidate terminals, as one that minimizes a sum of distances between the source terminal and the candidate terminal, and between the candidate terminal and the recipient terminal.

10. The method according to claim 1, further comprising:
    determining a distance separating the source terminal and the relay terminal;
    determining a first set of terminals located at a shorter distance than said distance from the source terminal;
    determining a second set of terminals located at a shorter distance than said distance from the source terminal;
    determining terminals common to said first and second sets, referred to as candidate terminals, and sending a sequence of predetermined symbols by the source terminal to said candidate terminals, with the relay terminal being selected as the candidate terminal detecting said sequence with the lowest error rate.

11. The method according to claim 1, wherein said recipient terminal, receiving both the source signal and the relayed signal implements steps comprising:
    measuring, for each frame of a first subset of frames of the received signal, not corresponding to a frame of the relayed signal, energies received in different positions of the PPM modulation alphabet, thus obtaining a first energy value for each modulation position;
    measures measuring, for each frame of a second subset of frames of the received signal, each corresponding to a frame of the relayed signal, energies received in each position of said PPM modulation alphabet and in a position obtained on a basis of said permutation, thus obtaining a second and a third energy value for each modulation position;
    summing, for each modulation position, said first, second and third energy values, thus obtaining a total energy value for each modulation position;
    comparing the total energy values for each modulation position and determining a position corresponding to a highest total energy value; and
    determining said data symbol on a basis of the position corresponding to the highest total energy value.

12. A transmission/reception module of a UWB pulse telecommunications terminal, said module comprising:
    means for time slicing a signal received by said terminal according to a plurality of consecutive time windows corresponding to the frames of a UWB signal transmitted by a source terminal, thus obtaining a plurality of frame signals;

means for measuring, for at least one of said frames, an energy of a frame signal in a plurality of modulation positions of a predetermined PPM alphabet;

means for detecting a position corresponding to a highest of the energies thus measured in said frame;

permutation means for permuting positions of said PPM alphabet in order to obtain a permuted position from the position thus detected; and means for generating a pulse in said permuted position during a subsequent frame of the received signal, following the at least one of said frames.

13. The transmission/reception module according to claim 12, wherein the permutation means performs a cyclic shift of said alphabet.

14. The transmission/reception module according to claim 12, wherein said subsequent frame is consecutive to the at least one of said frames.

15. A reception module in a UWB pulse telecommunications terminal in which a data symbol is transmitted in a form of a signal, referred to as a source signal, said source signal being constituted by a sequence of identical frames, with each frame containing a pulse that is position-modulated by a PPM modulation alphabet, said reception module comprising:

means for time slicing a signal received by the reception module, according to a plurality of time windows each corresponding to two consecutive frames of the source signal, referred to as first and second frames;

means for measuring an energy of the signal received, in each first frame, at each PPM alphabet modulation position, thus obtaining a first energy value for each modulation position;

means for measuring an energy of the signal received, in each second frame, at each PPM alphabet modulation position and at each position obtained from each PPM alphabet modulation position by applying a predetermined permutation, thus obtaining second and third energy values for each modulation position;

means for summing, for each modulation position, the first, second and third energy values, thus obtaining a fourth energy value for each modulation position;

means for summing, for each modulation position, the fourth energy values obtained for different time windows, thus obtaining a fifth energy value for each modulation position;

means for determining a modulation position corresponding to a highest of said fifth energy values; and means for determining, on a basis of the modulation position corresponding to the highest of said fifth energy values, said data symbol.

16. The reception module according to claim 15, wherein said predetermined permutation is a cyclic shift of said PPM alphabet.

* * * * *